United States Patent
Kumar et al.

[11] Patent Number: 5,850,041
[45] Date of Patent: Dec. 15, 1998

[54] VIBRATORY ROTATION SENSOR WITH AC FORCING AND SENSING ELECTRONICS

[75] Inventors: Lalit Kumar, Santa Barbara; Michael J. Foster; Thomas A. Bittner, both of Goleta, all of Calif.

[73] Assignee: Litton Systems, Inc., Woodland Hills, Calif.

[21] Appl. No.: 821,785

[22] Filed: Mar. 21, 1997

[51] Int. Cl.$^6$ .............................. G01C 19/00; G01P 9/00
[52] U.S. Cl. .................................. 73/504.12; 73/504.13; 310/316
[58] Field of Search ............................ 73/504.13, 504.12, 73/504.02; 310/323, 316

[56] References Cited

U.S. PATENT DOCUMENTS

| | | | |
|---|---|---|---|
| 3,719,074 | 3/1973 | Lynch | 73/504.13 |
| 4,157,041 | 6/1979 | Loper, Jr. et al. | 73/504.13 |
| 4,951,508 | 8/1990 | Loper, Jr. et al. | 73/504.13 |
| 5,247,221 | 9/1993 | Atsuta | 310/32.3 |
| 5,287,033 | 2/1994 | Morton | 310/316 |
| 5,383,362 | 1/1995 | Putty et al. | 73/504.01 |

*Primary Examiner*—Hezron Williams
*Assistant Examiner*—Richard A. Moller
*Attorney, Agent, or Firm*—Robert E. Malm

[57] ABSTRACT

The invention is a method and apparatus for controlling the vibration modes of a vibratory rotation sensor (VRS) comprising a resonator and a housing which together serve as the ground potential reference. The resonator has a surface with a conductive region and the housing has a plurality of attached electrodes positioned opposing the conductive region on the resonator. The parameters of the resonator standing-wave vibration pattern are determined by feeding an ac sensing signal to the conducting region on the resonator and obtaining one or more vibration signals while the electric potential of the conductive region on the resonator is maintained within 100 millivolts of ground. Each vibration signal is a replica of the ac sensing signal with amplitude modulation which is a periodic function of the distance from a point in the conducting region of the surface of the resonator to an opposing housing electrode. The frequency of the amplitude modulation is the vibration frequency of the resonator. The parameters of the standing wave are determined from the vibration signals, and these parameters are used in controlling the standing-wave parameters by generating appropriate ac forcing voltages which are applied to the housing electrodes.

16 Claims, 3 Drawing Sheets

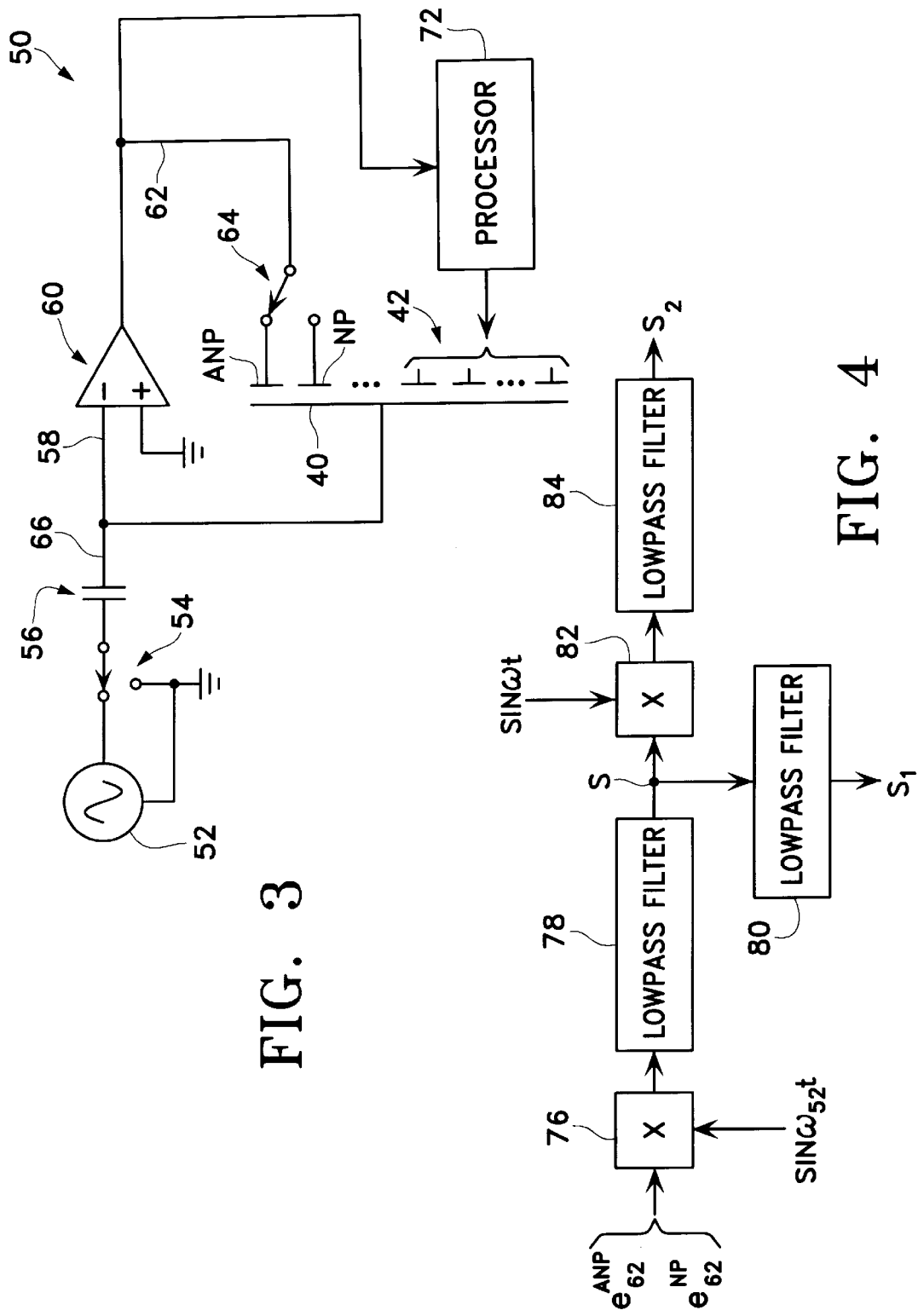

VIBRATORY ROTATION SENSOR WITH AC FORCING AND SENSING ELECTRONICS

CROSS-REFERENCES TO RELATED APPLICATIONS

The subject matter of this invention is shared by the inventions disclosed in patent applications Vibratory Rotation Sensor with Multiplex Electronics by Matthews, Darling, and Varty, Vibratory Rotation Sensor with Whole-Angle Tracking by Matthews, Varty, Li, and Lynch, and Vibratory Rotation Sensor with AC Driving Voltages by Lynch.

BACKGROUND OF THE INVENTION

This invention relates generally to vibratory rotation sensors and more specifically to the electronics associated with such rotation sensors.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are bonded to the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 attached to the inner member 16 are in close proximity to the interior metalized surface 30 of the hemispherical resonator 14.

Capacitive forces can be exerted on the hemispherical resonator 14 by means of appropriate forcing voltages between the hemispherical resonator 14 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodes are 90 degrees out of phase with 90-degree and the 270-degree antinodes. The standing wave causes the shape of the rim of the hemispherical resonator to change from circular to elliptical (with major axis through the 0-degree/80-degree antinodes) to circular to elliptical (with major axis through the 90-degree/270-degree antinodes.

Rotation of the VRS 10 about an axis normal to the plane of the hemispherical-resonator rim 34 causes the standing wave to rotate in the opposite direction by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the output voltages at the very high impedance (≅constant charge) pickoff electrodes 24 as the hemispherical resonator 14 vibrates and the capacitances of the pickoff electrodes 24 with respect to the hemispherical resonator vary. An X-axis signal $V_x$ is obtained from the combination $V_0 - V_{90} + V_{180} - V_{270}$ where the subscripts identify the angular positions relative to the X axis of the electrodes from which the voltages originate. Similarly, a Y-axis signal $V_y$ is obtained from the combination $V_{45} - V_{135} + V_{225} - V_{315}$. The tangent of twice the standing-wave pattern angle with respect to the 0-degree (i.e. X) axis is given by the ratio of $V_y$ to $V_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A DC bias voltage is typically maintained on the hemispherical resonator 14. The presence of the DC bias voltage results in slow changes in the electrical properties of the HRG which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is a method and apparatus for controlling the vibration modes of a vibratory rotation sensor (VRS) comprising a resonator and a housing which together serve as the ground potential reference. The resonator has a surface with a conductive region and the housing has a plurality of attached electrodes positioned opposing the conductive region on the resonator. The parameters of the resonator standing-wave vibration pattern are determined by feeding an ac sensing signal to the conducting region on the resonator and obtaining one or more vibration signals while the electric potential of the conductive region on the resonator is maintained within 100 millivolts of ground. Each vibration signal is a replica of the ac sensing signal with amplitude modulation which is a periodic function of the distance from a point in the conducting region of the surface of the resonator to an opposing housing electrode. The frequency of the amplitude modulation is the vibration frequency of the resonator. The parameters of the standing wave are determined from the vibration signals, and these parameters are used in controlling the standing-wave parameters by generating appropriate ac forcing voltages which are applied to the housing electrodes.

BRIEF DESCRIPTION OF THE DRAWINGS

FIG. 3 is a schematic diagram of the forcing and sensing electronics for a vibratory rotation sensor.

FIG. 4 is a block diagram of the vibration signal demodulator.

DESCRIPTION OF THE PREFERRED EMBODIMENTS

Figure 1:
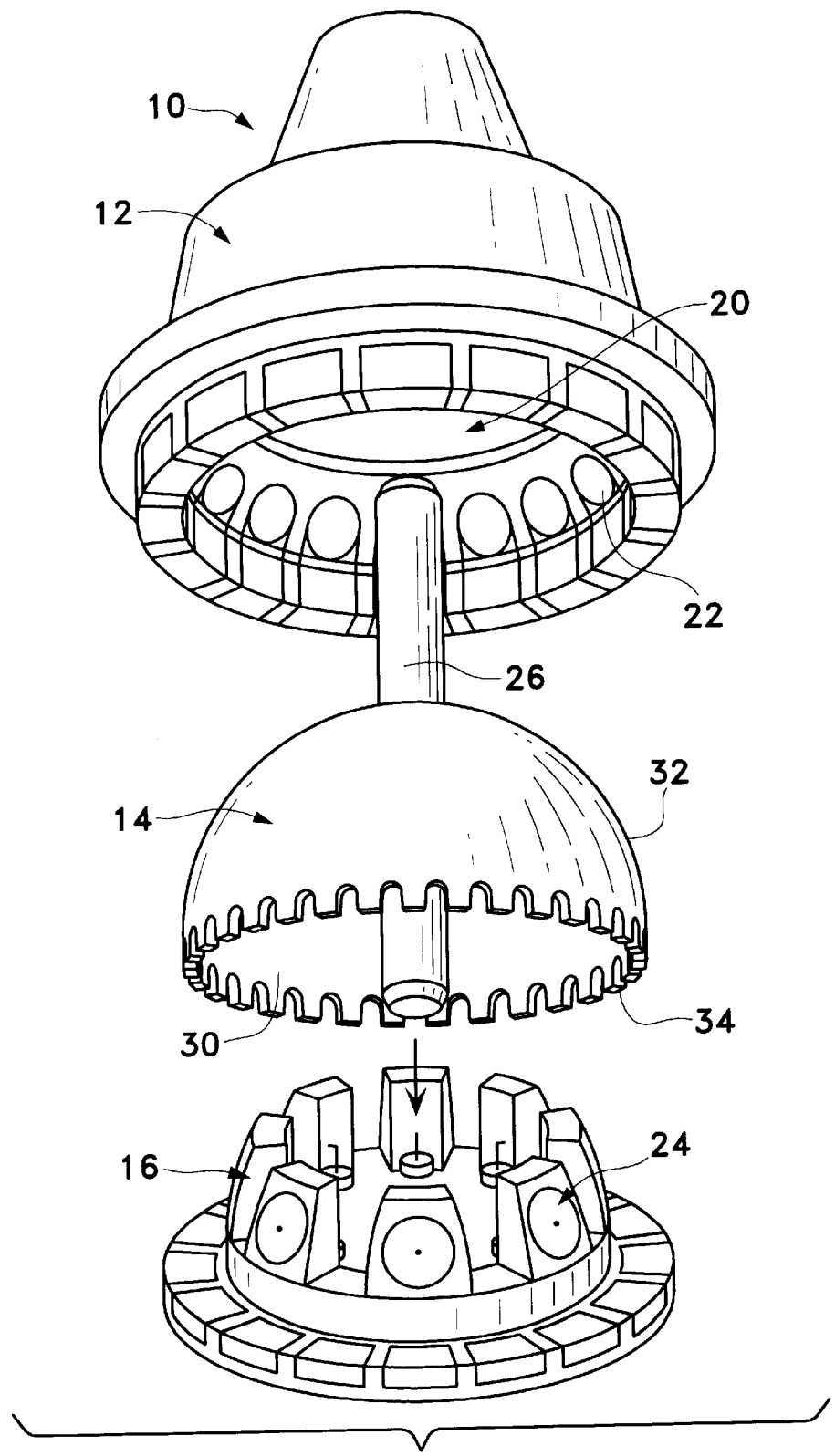
FIG. 1 shows the component parts of a prior-art vibratory rotation sensor.
Figure 2:
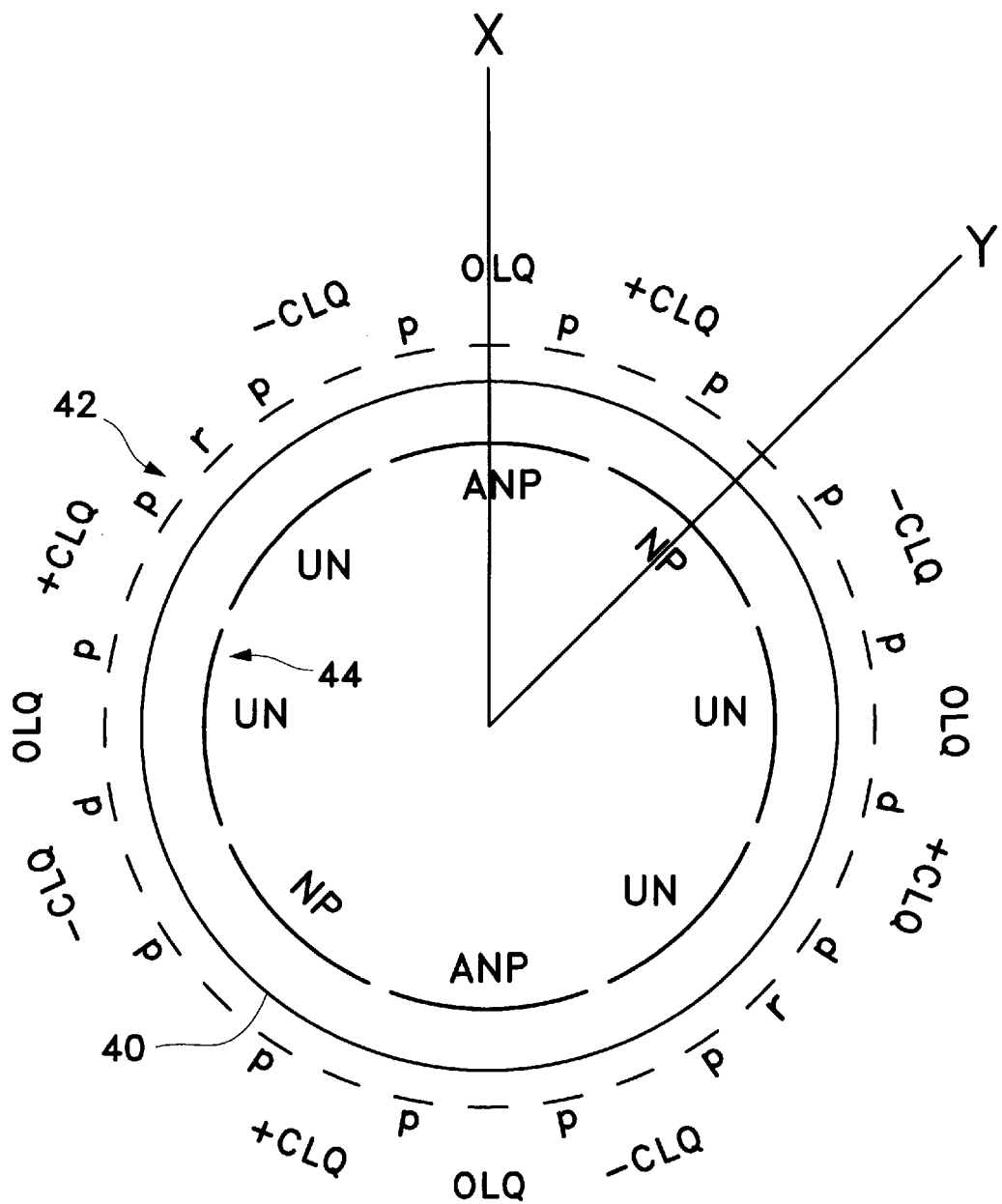
FIG. 2 is a symbolic representation of the conducting region of the resonator and the opposing electrodes that are attached to the vibratory rotation sensor housing.

An embodiment of a vibratory rate sensor which utilizes 32 discrete forcer electrodes (instead of the ring forcer electrode 20 and the 16 discrete forcer electrodes 22 shown in FIG. 1) is shown symbolically in FIG. 2 together with reference X and Y axes. The resonator is denoted by the circle 40. The 32 discrete forcer electrodes 42 are located on the outer member of the VRS and the 8 pickoff electrodes 44 are located on the inner member.

The VRS can be mechanized to operate either as a rate gyro (Force-to-Rebalance, FTR) or as a rate integrating gyro (Whole-Angle, WA). In the FTR mode of operation, the resonator's flexing amplitude along the X axis is maintained at a fixed non-zero value and the flexing amplitude along the Y axis is maintained at zero by applying voltages proportional to the inertial rate input $\Omega$ to electrodes 42 identified by the symbols "r".

In the WA mode, nulling forces along the Y-axis are not provided, and the constant-amplitude flexing pattern is allowed to rotate. The angle of pattern rotation is proportional to the inertial rotation input $\int \Omega dt$.

The maintenance of X-axis amplitude can be accomplished either by applying a voltage at the X-axis vibration frequency $\omega_x$ to the forcer electrodes 42 directly above the antinodes located at 0 and 180 degrees with respect to the X axis or by applying a voltage parametrically at $2\omega_x$ to the electrodes 42 identified by the symbol "p".

In addition to the desired inphase flexing motion of the resonator, there is in general an undesirable quadrature flexing motion resulting from asymmetries in the frequency axes and misalignment between the pickoff and principal frequency and damping axes. This undesirable quadrature vibration mode is suppressed by placing voltages on open-loop quadrature (OLQ) electrodes 42 and plus/minus closed loop quadrature ($\pm$CLQ) electrodes 42.

The radial displacements x and y of the resonator are sensed by the pickoff pads 44 identified by the symbols "ANP" (antinodal pickoff pad) and "NP" (nodal pickoff pad) along the X and Y axes respectively. The pads identified by the symbol "UN" are not used. The radial displacements are governed by the following coupled differential equations:

$$\frac{d^2x}{dt^2} + \frac{2}{T_x}\frac{dx}{dt} + \omega_x^2 x = f_x + 2k\Omega\frac{dy}{dt} \quad (1)$$

$$\frac{d^2y}{dt^2} + \frac{2}{T_y}\frac{dy}{dt} + \omega_y^2 y = f_y - 2k\Omega\frac{dx}{dt}$$

where $T_x$ and $T_y$ are damping constants, $\omega_x$ and $\omega_y$ are the angular vibration frequencies along the X and Y axes, $f_x$ and $f_y$ are the forces exerted on the resonator along the X and Y axes, k is a constant and $\Omega$ is the angular rate of rotation of the resonator. The application of a parametric drive to the electrodes indicated in FIG. 2 results in forces $f_{para}x$ and $f_{para}y$ being applied along the X and Y axes. The application of a rate drive to the electrodes indicated in FIG. 2 results in a force $f_{rate}$ being applied along the axis transverse to the Y axis.

The equations above become:

$$\frac{d^2x}{dt^2} + \frac{2}{T_x}\frac{dx}{dt} + \omega_x^2 x = f_{para}x + 2k\Omega\frac{dy}{dt} \quad (2)$$

$$\frac{d^2y}{dt^2} + \frac{2}{T_y}\frac{dy}{dt} + \omega_y^2 y = f_{para}y + f_{rate} - 2k\Omega\frac{dx}{dt}$$

In the force-to-rebalance mode, $d^2y/dt^2$, $dy/dt$, and y are all equal to zero and $$f_{rate} = 2k\Omega\frac{dx}{dt} \quad (3)$$

Elimination of the DC bias voltage on the resonator is viewed as (1) a means of reducing or eliminating the effects of charge-migration phenomena which is believed to be the cause of VRS scale factor variations over time and (2) a means of eliminating the use of high impedance pickoffs which are very sensitive to stray spurious signals. An embodiment of the VRS forcing and sensing electronics 50 which eliminates the conventional DC bias voltage is shown in FIG. 3.

The AC source 52 connects through the microswitch 54 and the capacitor 56 to the resonator 40 and to the input terminal 58 of the operational amplifier 60. The output 62 of the operational amplifier 60 connects through microswitch 64 to pickoff electrodes ANP and NP. Microswitch 64 periodically switches the output 62 of the operational amplifier 60 between the ANP and the NP pickoff electrodes in order to sense the amplitudes of the inphase and quadrature resonator vibration modes. The microswitch 54 grounds the input terminal of capacitor 56 while microswitch 64 is switching between the ANP and the NP electrodes.

The input impedance of the operational amplifier 60 is sufficiently high that the input current can be assumed to be zero. The gain of the operational amplifier 60 is sufficiently high that if the output voltage does not saturate, the input voltage can be assumed to be negligible compared to other voltages. For example, if the output range is $\pm 10$ V and the amplifier gain is 1 gV/V, the maximum input voltage is only 10 nV. Limiting the electric potential of the resonator 40 to 10 nV is not required to avoid slow changes in the electrical properties of the HRG resulting from capacitance changes caused by charge-migration phenomena. A desirable upper limit to the electric potential of the resonator appears to be something like 0.1 V.

Stray capacitance exists between pickoff capacitors ANP and NP. Line 62 typically has a resistance of 10 ohms. To reduce coupling between pickoff capacitors ANP and NP to a negligible level, the output impedance of operational amplifier 60 should be less than 100 ohms.

It follows from the above that $$e_{52} = \frac{1}{C_{56}} \int i_{66} dt \quad (4)$$

$$e_{62}^{ANP} = \frac{1}{C_{ANP}} \int i_{62} dt$$

$$i_{66} = -i_{62}$$

where the subscripts denote the devices or lines in FIG. 3 and the superscript denotes the pickoff electrode to which the output 62 of the operational amplifier 60 is connected by microswitch 64.

It follows from the above equations that $$e_{62}^{ANP} = -\frac{C_{56}}{C_{ANP}} e_{52} \quad (5)$$

The capacitance of the pickoff electrode is given by $$C_{ANP} = \frac{\epsilon A}{x} \quad (6)$$

where x can be represented by the expression $$x + d_o + x_o \sin \omega t \quad (7)$$

and $\epsilon$ is the permittivity, A is the area of a pair of pickoff electrodes 44, $d_o$ is the nominal gap between the resonator 40 and pickoff electrodes 44, $x_o$ is the flexing amplitude of the resonator 40, and $\omega$ is the angular frequency of oscillation of the resonator 40.

Combining equations (5) and (6), we obtain $$e_{62}^{ANP} = K(d_o + x_o \sin \omega t)e_{52} \tag{8}$$

where $$K = -\frac{C_{56}}{\epsilon A} \tag{9}$$

Similarly, $$e_{62}^{NP} = K(d_o + y_o \sin \omega t)e_{52} \tag{10}$$

Expressing $e_{52}$ as a sinusoid of amplitude $V_{52}$ and angular frequency $\omega_{52}$, we obtain $$e_{62}^{ANP} = KV_{52}(d_o + x_o \sin \omega t) \sin \omega_{52} t$$

$$e_{62}^{NP} = KV_{52}(d_o + y_o \sin \omega t) \sin \omega_{52} t \tag{11}$$

Further processing of the $e_{62}$'s is accomplished in the processor 72 by the demodulation circuitry shown in FIG. 4. The results of mixing the $e_{62}$'s and $\sin \omega_{52} t$ in mixer 76 and filtering out harmonics of $\omega_{52}$ by means of lowpass filter 78 are $S^{ANP}$ and $S^{NP}$ in time sequence where $$S^{ANP} \propto KV_{52}(d_o + x_o \sin \omega t)$$

$$S^{NP} \propto KV_{52}(d_o + y_o \sin \omega t) \tag{12}$$

The average values $S_1^{ANP}$ and $S_1^{NP}$ of $S^{ANP}$ and $S^{NP}$ respectively are obtained by passing the S's through lowpass filter 80 with a cutoff angular frequency less than $\omega$.

$$S_1^{ANP} = S_1^{NP} \propto KV_{52} d_o \tag{13}$$

The quantities $S_2^{ANP}$ and $S_2^{NP}$ of $S^{ANP}$ and $S^{NP}$ respectively are obtained by mixing the S's with $\sin \omega w t$ in mixer 82 and filtering out $\omega$ and harmonics of $\omega$ by means of lowpass filter 84.

$$S_2^{ANP} \propto KV_{52} x_o$$

$$S_2^{NP} \propto KV_{52} y_o \tag{14}$$

The stability of signals $S_1$ and $S_2$ depends on the stability of AC voltage source 52 and the capacitor $C_{56}$. If these are both stable, then the nominal gap $d_o$ and the flexing amplitude $\omega_o$ can be determined with precision. A high-grade temperature-stabilized capacitor such as ATC-700 which has a temperature coefficient very nearly equal to zero could be used.

The circuit of FIG. 3 envisions using the two ANP electrodes connected together and the two NP electrodes connected together with microswitch 64 alternately connecting the output 62 of the operational amplifier 60 to the ANP and the NP electrodes. A more efficient circuit would utilize all eight pickoff electrodes connected in pairs in characterizing the vibration modes of the VRS. The ANP electrode pair and the NP electrode pair would constitute the ANP(+) and the NP(+) pairs respectively. The UN pairs on lines transverse to the X- and Y-axis constitute the ANP(−) and NP(−) pairs respectively since the signals on these pairs of electrodes are inverted versions of the signals on the pairs of electrodes identified with the plus signs. In order to accommodate these four pairs of electrodes, microswitch 64 would be a single-pole, four-throw switch which would switch successively to each of the four pairs of electrodes. The ANP (+) and ANP(−) signals would be combined and the NP (+) and NP(−) signals would be combined during subsequent processing of the signals.

The processor 72 operates on the $e_{62}$'s in a conventional way to produce forcing voltages for application to the electrodes 42.

In the force-to-rebalance mechanization of the HRG, the force $F_{rate}$ needed to null the nodal output is given by (see equations (3) and (7))

$$f_{rate} = 2k\Omega \frac{dx}{dt} = 2k\Omega \omega x_o \cos \omega t \tag{15}$$

This force is generated in the present invention by establishing a voltage $V_{rate}(+)$ or $V_{rate}(-)$ between the resonator electrode and the "r" electrodes of FIG. 2:

$$V_{rate}(+) = V_{\omega/2} \cos [\tfrac{1}{2}(\omega t)]$$

$$V_{rate}(-) = V_{\omega/2} \sin [\tfrac{1}{2}(\omega t)] \tag{16}$$

The resulting forces $f_{rate}(+)$ and $f_{rate}(-)$ are proportional to the square of the voltage between the electrodes:

$$f_{rate}(+) \propto V_{\omega/2}^2 \cos^2 [\tfrac{1}{2}(\omega t)] = \tfrac{1}{2} V_{\omega/2}^2 (1 + \cos \omega t)$$

$$f_{rate}(-) \propto V_{\omega/2}^2 \sin^2 [\tfrac{1}{2}(\omega t)] = \tfrac{1}{2} V_{\omega/2}^2 (1 - \cos \omega t) \tag{17}$$

The cosine term is the required forcing finction. The DC term has a negligible effect on the resonator dynamics. The sign of the forcing function is selected by choosing either $f_{rate}(+)$ and $f_{rate}(-)$.

As mentioned earlier in connection with FIG. 1, capacitive forces can be exerted on the hemispherical resonator 14 by means of appropriate forcing voltages between the hemispherical resonator 14 and the ring forcer electrode 20 to cause the hemispherical resonator to vibrate in the lowest-order inextensional (or flexing) mode. The ring forcer electrode subsequently evolved into discrete electrodes symmetrically distributed around the perimeter of the resonator as shown in FIG. 2.

In order to maintain the vibration, forces must be applied to the resonator to cancel the damping forces proportional to $dx/dt$ in equation (1). If $x$ varies as $\sin \omega t$, then the forces must vary as $\cos \omega t$. Such forces can be obtained by placing voltages which vary as $\cos \omega t$ on the "p" electrodes of FIG. 2.

The net force resulting from voltages $V_p$ applied to two "p" electrodes displaced from one another by 90 degrees $$f(t, \theta_i) \propto \frac{V_p^2}{[d_o - x(\theta_i)]^2} - \frac{V_p^2}{[d_o - x(\theta_i + \pi/2)]^2} \tag{18}$$

where $d_o - x(\theta)$ is the distance between the resonator 40 and the "p" electrode displaced by $\theta_i$ from the X axis in FIG. 2. Since $x(\theta_i) = -x(\theta_i + \pi/2)$, $$f(t, \theta_i) \propto \frac{V_p^2}{[d_o - x(\theta_i)]^2} - \frac{V_p^2}{[d_o + x(\theta_i)]^2} \tag{19}$$

and assuming $x(\theta_i) << d_o$, $$f(t, \theta_i) \propto V_p^2 x(\theta_i) \tag{20}$$

Given that $$x(\theta_i) = x_o \cos 2\theta_i \sin \omega t \tag{21}$$

then $$f(t, \theta_i) \propto V_p^2 x_o \cos 2\theta_i \sin \omega t \tag{22}$$

Summing over all $\theta_i$'s in the angular segments from $-\pi/4$ to $+\pi/4$ and $3\pi/4$ to $5\pi/4$ (which includes all "p" electrode pairs), we obtain $f(t)$:

$$f(t) \propto V_p^2 x_o \sin \omega t \quad (23)$$

We now postulate the following forcing voltage:

$$V_p = V_{po} \sin (\omega t + \phi) \quad (24)$$

Substituting in equation (23), we obtain $$f(t) \propto V_{po}^2 x_o \sin^2 (\omega t + \phi) \sin \omega t \quad (25)$$

which can be rewritten as $$f(t) \propto V_{po}^2 x_o [\sin \omega t + \tfrac{1}{2} \sin (\omega t + 2\phi) - \tfrac{1}{2} \sin (3\omega t + 2\phi)] \quad (26)$$

The first and third terms have negligible effect on the dynamics of the resonator and can be ignored. The second term has maximum effect if $\phi = \pi/4$ in which case $$f(t) \propto V_{po}^2 x_o \cos \omega t \quad (27)$$

Quadrature control is exercised by applying voltages to electrodes spaced 90 degrees apart (see FIG. 2). Thus, equation (22) is applicable:

$$f_Q(t) \propto V_Q^2 x_o \sin \omega t \quad (28)$$

where we have set $\theta_o$ equal to zero and the subscripts to Q. If:

$$V_Q = V_{Qo} \sin \omega_Q t \quad (29)$$

then $$f f_Q(t) \propto V_{Qo}^2 x_o \sin_2 \omega_Q t \sin \omega t \quad (30)$$

This expression can be rewritten as $$f_Q(t) \propto V_{Qo}^2 x_o [\sin \omega t - \tfrac{1}{2} \sin (2\omega_Q + \omega) t + \tfrac{1}{2} \sin (2\omega_Q - \omega) t] \quad (31)$$

If $\omega_Q$ equals $\omega$, the second term has no forcing effect and the first and third terms combine to form the proper quadrature forcing function. Other values for $\omega_Q$ may be used in which case neither the second nor the third terms have any forcing effect, and the first term provides quadrature forcing by itself.

Additional details concerning vibratory rotation sensors are contained in U.S. Pat. No. 4,951,508 by Loper, Jr. et al. dated Aug. 28, 1990 which is incorporated by reference.

What is claimed is:

1. A method for controlling the vibration modes of a vibratory rotation sensor (VRS), the VRS comprising a resonator and a housing, the electric potential of the resonator and housing being denoted as ground, the resonator having a surface with a conductive region, a plurality of electrodes being attached to the housing and positioned opposing the conductive region on the resonator, the method comprising the steps:

generating an ac sensing signal;

feeding the ac sensing signal to the conducting region on the resonator;

obtaining one or more vibration signals, each vibration signal being a replica of the ac sensing signal with amplitude modulation, the amplitude modulation being a periodic function of the distance from a point in the conducting region of the surface of the resonator to an opposing housing electrode, the frequency of the amplitude modulation being the vibration frequency of the resonator.

2. The method of claim 1 further comprising the steps: maintaining the electric potential of the conductive region on the resonator within 100 millivolts of ground.

3. The method of claim 1 further comprising the steps: generating one or more ac forcing voltages;

feeding each ac forcing voltage to one or more housing electrodes, each ac forcing voltage causing one or more forces to be exerted on the resonator.

4. The method of claim 3 wherein all of the voltages required to operate the VRS are ac voltages.

5. The method of claim 3 wherein the ratio of the vibration frequency of the resonator to the frequency of each ac forcing voltage is equal to a ratio of integers, the step of generating one or more ac forcing voltages including the step:

maintaining each ac forcing voltage in synchronism with the vibration of the resonator when the resonator is vibrating.

6. The method of claim 5 wherein the ratio of the vibration frequency of the resonator to the frequency of an ac forcing voltage is equal to one, the ac forcing voltage being applied to an annular electrode encircling the resonator for the purpose of maintaining the vibration of the resonator.

7. The method of claim 5 wherein the ratio of the vibration frequency of the resonator to the frequency of an ac forcing voltage is equal to one, the ac forcing voltage being applied to a plurality of electrodes encircling the resonator for the purpose of maintaining the vibration of the resonator.

8. The method of claim 5 wherein the ratio of the vibration frequency of the resonator to the frequency of an ac forcing voltage is equal to two, the ac forcing voltage being applied to one or more electrodes positioned at the nodes of the vibration pattern for the purpose of maintaining the vibration pattern in a fixed position relative to the VRS.

9. The method of claim 5 wherein the ac forcing voltage is applied to one or two electrode pairs for the purpose of suppressing quadrature vibrations, the electrodes comprising the pairs being spaced 90 degrees apart, the electrodes comprising a pair being spaced 90 degrees apart.

10. Apparatus for controlling the vibration modes of a vibratory rotation sensor (VRS), the VRS comprising a resonator and a housing, the electric potential of the resonator and housing being denoted as ground, the resonator having a surface with a conductive region, a plurality of electrodes being attached to the housing and positioned opposing the conductive region on the resonator, the apparatus comprising:

a sensing signal generator having an output port, the sensing signal generator providing an ac sensing signal at its output port;

one or more sensing circuits, each sensing circuit having an input port and an output port, the input port of each sensing circuit being connected to the output port of the sensing signal generator and the conducting region of the resonator, the output port of each sensing circuit being connected to one of the plurality of electrodes, each sensing circuit providing at its output port a vibration signal, each vibration signal being a replica of the ac sensing signal with amplitude modulation, the amplitude modulation being a periodic function of the distance from a point in the conducting region of the surface of the resonator to an opposing housing electrode, the frequency of the amplitude modulation being the vibration frequency of the resonator.

11. The apparatus of claim 10 further comprising:

one or more forcing function generators, each forcing function generator having an input port and an output port, the input port of each forcing function generator being connected to the output port of the one or more sensing circuits, the output port of each forcing function generator being connected to one or more housing electrodes, each forcing function generator supplying an ac forcing voltage at its output port, the ratio of the vibration frequency of the resonator to the frequency of each ac forcing voltage being equal to a ratio of integers, each ac forcing voltage being synchronized with the vibration signal.

12. The apparatus of claim 11 wherein the voltages required to operate the VRS are all ac voltages.

13. The apparatus of claim 11 wherein the ratio of the vibration frequency of the resonator to the frequency of an ac forcing voltage is equal to one.

14. The apparatus of claim 11 wherein the ratio of the vibration frequency of the resonator to the frequency of an ac voltage is equal to two.

15. The apparatus of claim 11 wherein the impedance to ground at the output port of each sensing circuit is less than 100 ohms.

16. Apparatus for controlling the vibration modes of a vibratory rotation sensor (VRS), the VRS comprising a resonator and a housing, the electric potential of the resonator and housing being denoted as ground, the resonator having a surface with a conductive region, a plurality of electrodes being attached to the housing and positioned opposing the conductive region on the resonator, the apparatus comprising:

a sensing signal generator having an output port, the sensing signal generator providing an ac sensing signal at its output port;

a sensing circuit having an input port and an output port, the input port of the sensing circuit being connected to the output port of the sensing signal generator and the conducting region of the resonator, the output port of the sensing circuit being connected in time sequence to a plurality of housing electrodes, the sensing circuit providing at its output port a plurality of vibration signals in time sequence, each vibration signal being a replica of the ac sensing signal with amplitude modulation, the amplitude modulation being a periodic function of the distance from a point in the conducting region of the surface of the resonator to an opposing housing electrode, the frequency of the amplitude modulation being the vibration frequency of the resonator.

* * * * *